Figure 1:
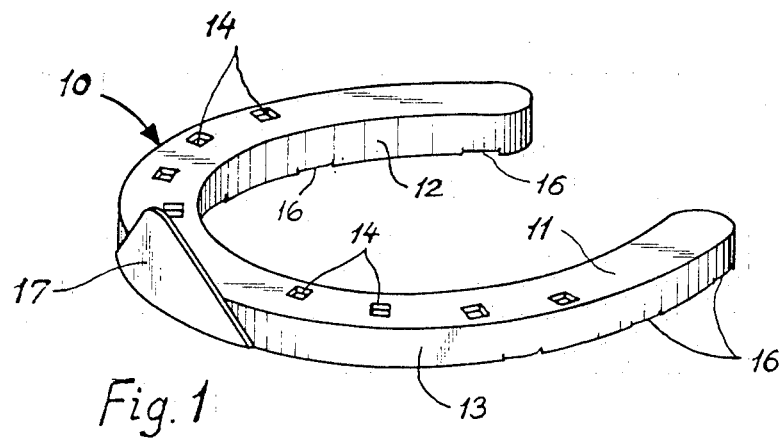

United States Patent [19]

Jungersen

[11] Patent Number: 4,585,068
[45] Date of Patent: Apr. 29, 1986

[54] HORSESHOE

[76] Inventor: Anders Jungersen, Fagerhojvaenge 3, DK-2950 Vedbaek, Denmark

[21] Appl. No.: 579,907

[22] PCT Filed: May 18, 1983

[86] PCT No.: PCT/DK83/00053
§ 371 Date: Jan. 18, 1984
§ 102(e) Date: Jan. 18, 1984

[87] PCT Pub. No.: WO83/03949
PCT Pub. Date: Nov. 24, 1983

[30] Foreign Application Priority Data

May 19, 1982 [DK] Denmark ............................ 2263/82

[51] Int. Cl.⁴ ............................ A01L 5/00; A01L 7/02
[52] U.S. Cl. ......................................... 168/11; 168/13
[58] Field of Search ...................... 168/11, 12, 13, 23, 168/31

[56] References Cited

U.S. PATENT DOCUMENTS

| | | | |
|---|---|---|---|
| 602,387 | 4/1898 | Krumscheid | 168/13 |
| 610,804 | 9/1898 | Evans | 168/13 |
| 646,029 | 3/1900 | Long | 168/12 |
| 660,788 | 10/1900 | Conway | 168/13 |
| 661,593 | 11/1900 | Waste | 168/13 |
| 749,299 | 1/1904 | Jones | 168/13 |
| 770,917 | 9/1904 | Myers | 168/11 |
| 4,122,900 | 10/1978 | Barr et al. | 168/12 |

FOREIGN PATENT DOCUMENTS 8597 4/1897 Sweden .

Primary Examiner—Robert P. Swiatek
Attorney, Agent, or Firm—Finnegan, Henderson, Farabow, Garrett & Dunner

[57] ABSTRACT

A two-part horseshoe consists of a channel-shaped upper part (10) to be nailed to the horse's hoof and an exchangeable lower part (20), which is made of an elastic material and has a ridge member (22) that can be pressed up into the channel (15) of the upper part. The side walls of the channel have a plurality of inwardly extending projections (16) with end faces directed toward the channel bottom (11), and the side walls of the ridge member are formed with corresponding recesses (25) which the projections snap into when the ridge member is pressed into position in the channel. In the front portion of the lower part there is embedded a metal insert (40) having partly a locking hook (43) to cooperate with a corresponding locking hook (19) on the front side wall (13) of the upper part, partly a plate-shaped member (41) forming a toe wear bracket on the underside of the lower part. When the projections (16) of the upper part are brought into engagement with the recesses (25) in the lower part they prevent such displacement of the lower part with respect to the upper part as is required to release the locking hooks from the locking engagement. Thus, the lower part cannot be loosened by the influences which occur in use; it can only be removed in a specific manner, viz. progressively from the rear ends and starting with the use of a hoof cleaner or a similar object as a crowbar or lever.

19 Claims, 23 Drawing Figures

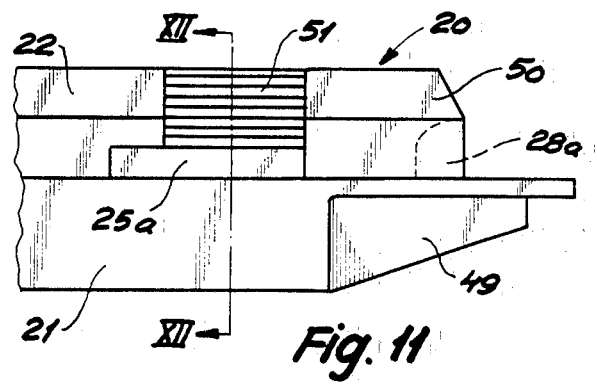
Fig. 11
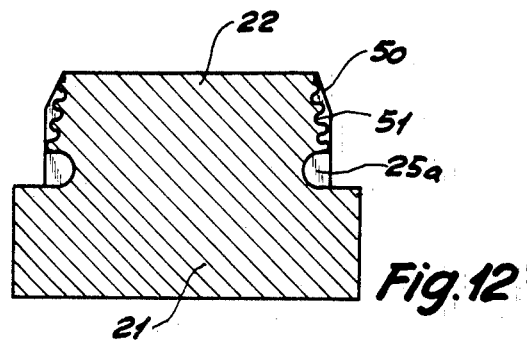
Fig. 12
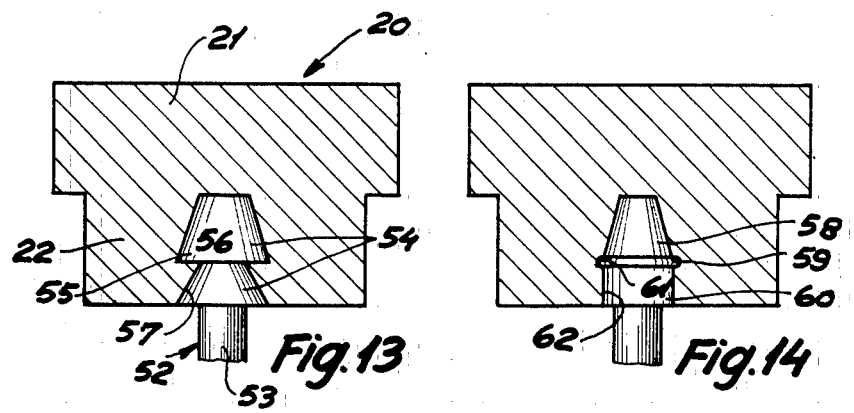
Fig. 13
Fig. 14

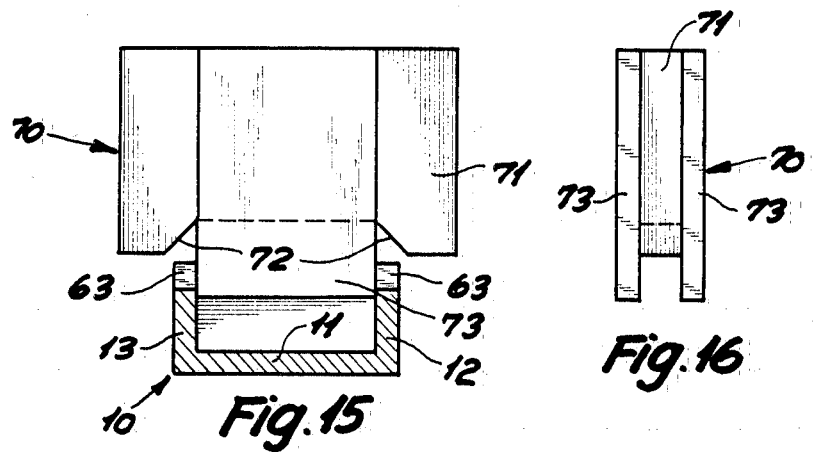
Fig.15
Fig.16
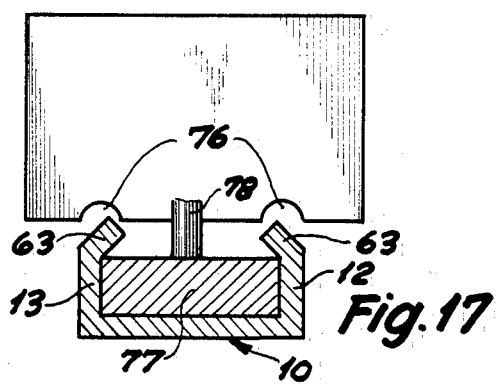
Fig.17
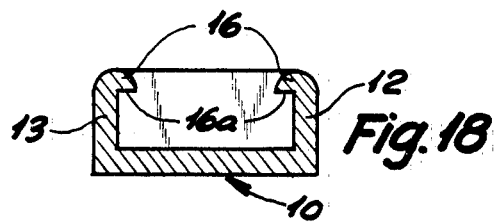
Fig.18

4,585,068

HORSESHOE

The invention relates to a horseshoe including an elastic lower part that reduces the load on the bones and muscles of the horse by its spring effect, in particular when the horse strikes a hard surface.

The U.S. Pat. Spec. No. 610 804 discloses a two-part horseshoe with an elastic lower part, where the sides of the ridge member of this part are formed with tongues or flanges to protrude into corresponding grooves in the side walls of the upper part. The tongues or the flanges and the grooves have a rectangular cross-section so that the lower part must be applied by inserting its ridge member longitudinally into the upper part. This requires a very loose fit between the two parts, which makes it necessary to retain the lower part by means of transverse rivets extended through holes in the side walls of the upper part and into the ridge member of the lower part. The use of such horseshoes involves the risk that the retaining rivets and then the lower part fall off.

The Swedish Pat. Spec. No. 8 597 discloses a horseshoe comprising two metallic parts, a fixed and an exchangeable one, with an intermediate packing. The lower part is detachably attached to the upper part by means of a locking pin which is slidably mounted on the front of the upper part and is spring loaded to engage a hole in the lower part. Fixed, cooperating engagement means are provided at the rear ends of the two parts.

The U.S. Pat. Spec. No. 660 788 discloses a two-part horseshoe with an elastic lower part, where the side walls of the channel-shaped upper part have spaced, inwardly directed hooks acting as barbs to retain the lower part after the lower part has been pressed past the hooks into the upper part. Such securing is insufficient to withstand the influences occurring in practice.

The object of the invention is to provide a horseshoe of the present type whose lower part is easy to exchange without using any tool other than e.g. a hoof cleaner, but which is nevertheless firm in position even under extremely severe conditions of use.

This object is achieved by providing cooperating projections and recesses on the upper part of the horseshoe, which is attached to the horse's hoof, and the exchangeable lower part, which consists of an elastic material, in which the projections are provided on the upper part and have an inclined, downwardly extending face and the recesses are formed in the ridge member of the lower part. An insert of a hard, strong material is embedded in the front or toe portion of the lower part and this insert and the upper part are formed with cooperating locking means which upon being engaged with each other can be fixed in locking engagement by causing the cooperating projections and recesses to engage each other by impression of the lower part into the upper part. The projections and the recesses, in addition to keeping the ridge member of the lower part in position on the upper part at the points, viz. the rearwardly directed forks of the shoe, where the detaching forces are relatively small, also serve the important function of keeping the locking means lockingly engaged at the front of shoe where the greatest forces are applied.

To further enhance the reliability of securing, the parts of the horseshoe together, the insert has a portion which, in the assembled horseshoe, protrudes upwardly in front of the rear side wall of the upper part. The rear side wall of the upper part prevents the upwardly extending portion of the insert from moving more than just slightly rearwards under the action of forces which urge the elastic lower part rearwards with respect to the upper part, and which, in some forms of locking means, might tend to cancel the locking engagement.

Preferably, the locking means are formed by a first locking hook extending rearwardly from the front portion of the front side wall of the upper part, and a second locking hook so disposed on the insert that upon displacement of the lower part with respect to the upper part, the two locking hooks can be caused to overlap each other with the locking hook of the insert disposed closest to the channel bottom of the upper part. This has the advantage that the locking means can only be disengaged when the lower part is shifted longitudinally with respect to the upper part, and such movement is effectively prevented not only by the cooperating recesses and projections, but also by the considerable friction between the tightly fitting lower part ridge member and the upper part.

An important advantage in the use of an exchangeable lower part is that the rider may have a range of various lower parts which are each specially adapted to special conditions. Some lower parts may thus have moulded spikes for use on icy surfaces or bosses for use on soft surfaces. Lower parts for use on asphalt or a similar surface may expediently have a smooth underside without protruding parts.

Figure 2:
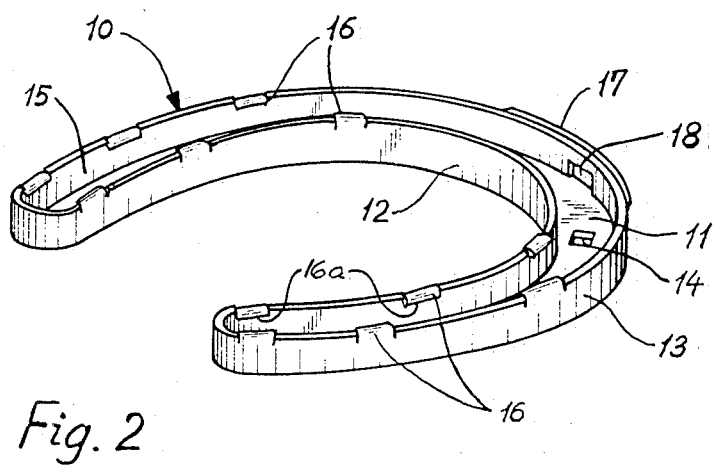
Figure 23:
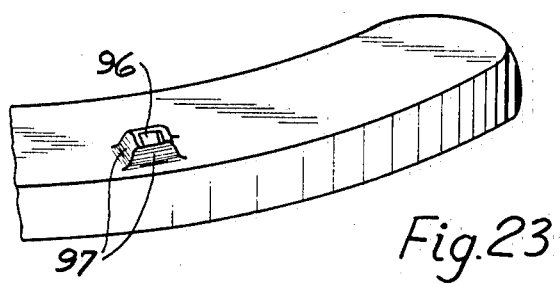
Figure 3:
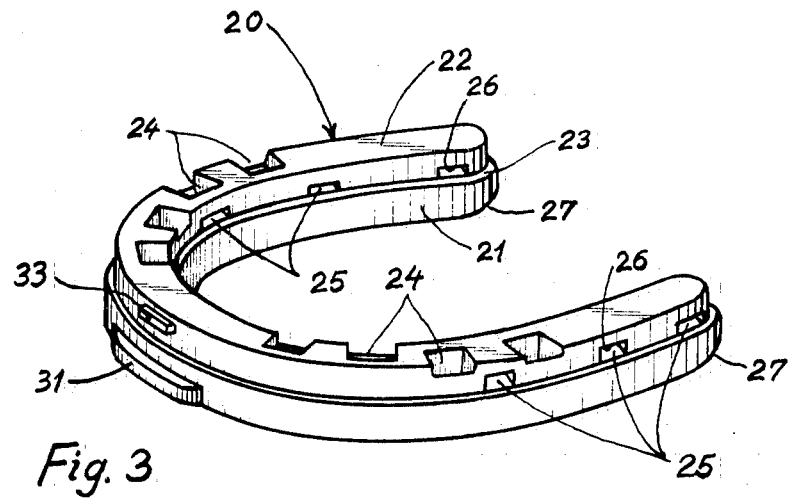
Figure 4:
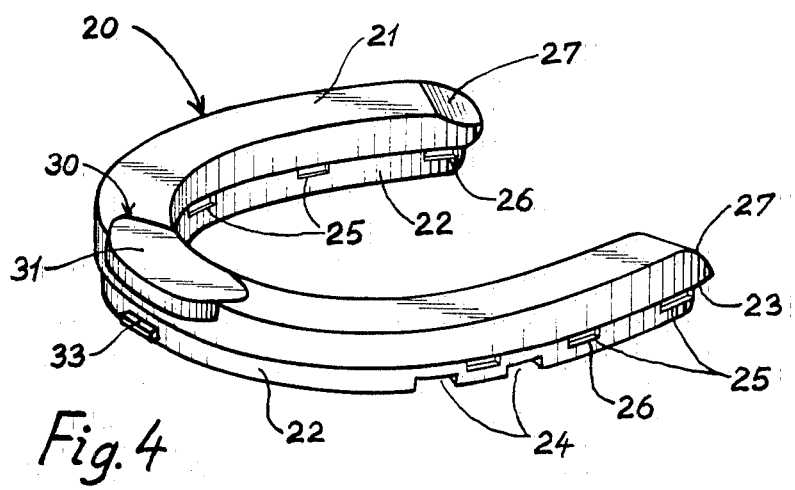
Figure 5:
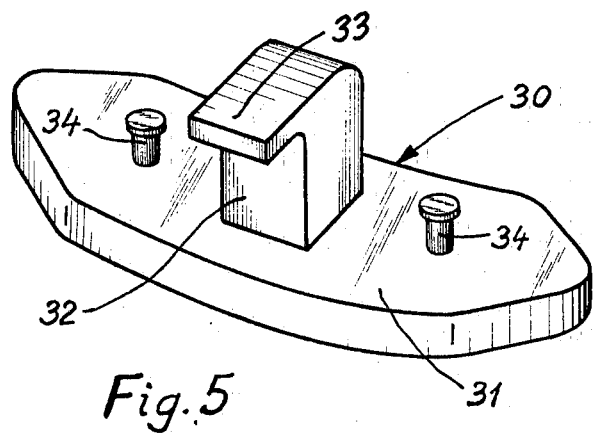
Figure 6:
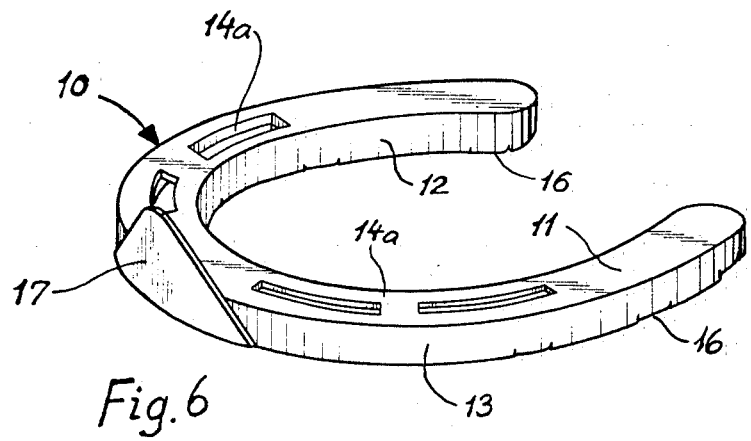
Figure 7:
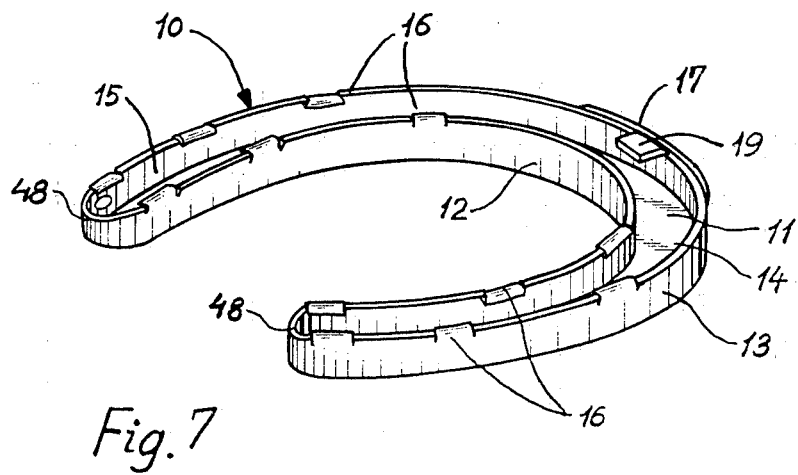
Figure 8:
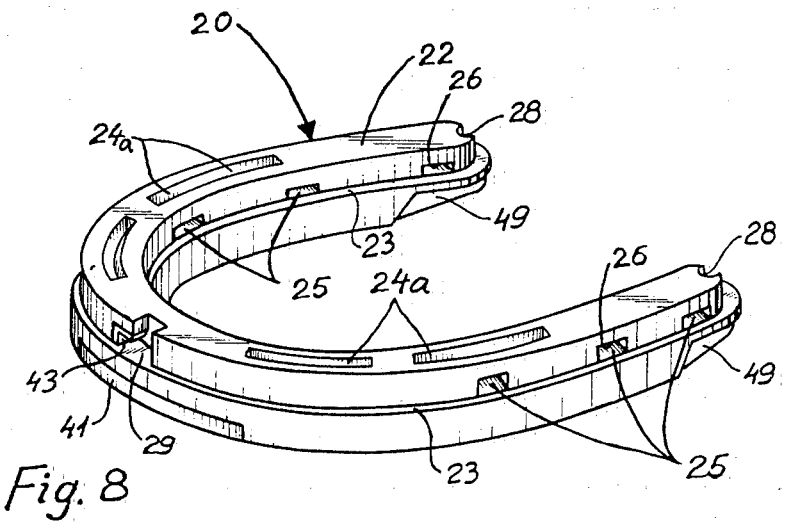
Figure 9:
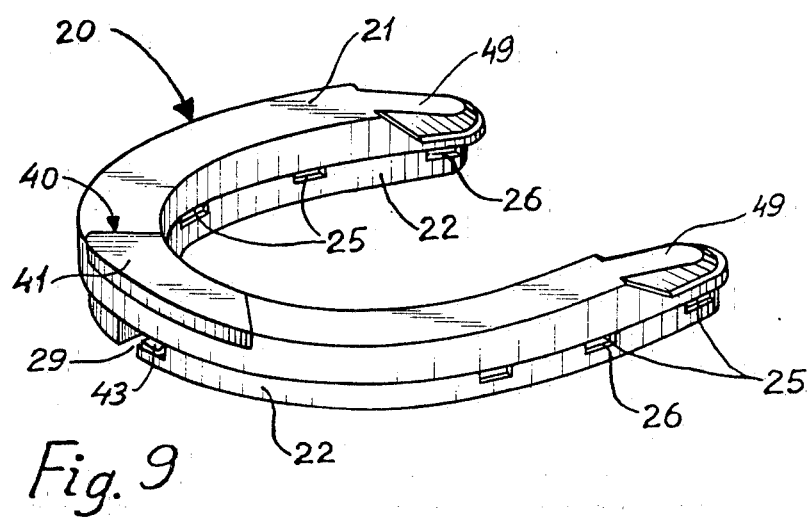
Figure 10:
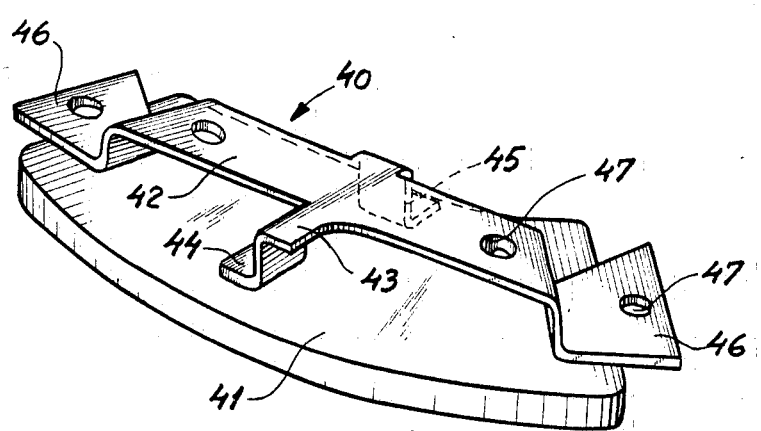
Figure 19:
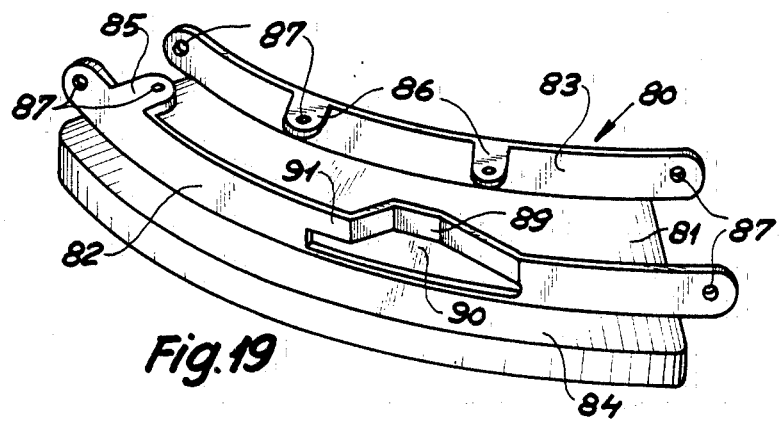
Figure 20:
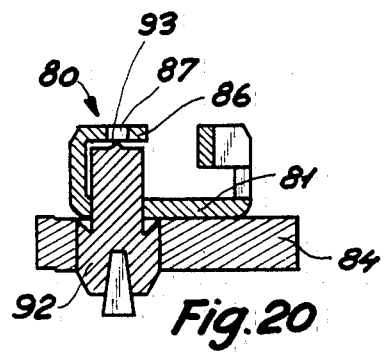
Figure 22:
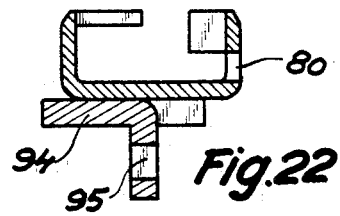
Figure 21:
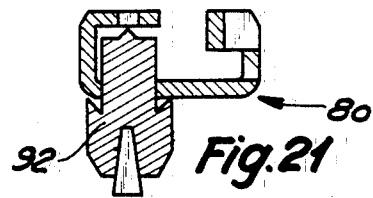

The invention will be explained more fully below with reference to the drawing, in which FIGS. 1 and 2 are oblique bottom views of an embodiment of the horseshoe, FIGS. 3 and 4 are oblique top and oblique bottom views, respectively, of the lower part, FIG. 5 shows a metallic insert incorporated in the lower part, FIGS. 6 and 7 are oblique top and oblique bottom views, respectively, of another embodiment of the horseshoe of the invention, FIGS. 8 and 9 are oblique top and oblique bottom views, respectively, of the lower part for this horseshoe, FIG. 10 shows a metallic insert incorporated in the latter lower part, FIG. 11 is a side view of the rear end portion of a modified embodiment of the lower part, FIG. 12 is a section taken along the line XII—XII in FIG. 11, FIGS. 13 and 14 are cross-sectional views of the head end of two different embodiments of nails of the invention and lower parts for receiving said nails, FIG. 15 is a side view of a tool for use in the manufacture of an upper part like the one shown in FIGS. 1 and 2 or 6 and 7 while performing a moulding operation, which is part of the method of the invention, on such an upper part, FIG. 16 is an end view of the same tool, FIG. 17 shows another tool in the process of a final moulding operation, which forms another part of the method of the invention, on the upper part, and FIG. 18 is a cross-section of the fork of the upper part thus treated, FIG. 19 shows a modified embodiment of the insert, FIGS. 20 and 21 are vertical sections of an insert like the one shown in FIG. 19 and with a calk placed therein, with and without a wear plate, respectively, FIG. 22 is a vertical section of an insert with a welded anchoring angle, and FIG. 23 shows an upper part with a special arrangement of the nail holes.

The upper part shown in FIGS. 1 and 2 is generally designated by 10 and is made of metal by drawing and forms a channel 15 with a bottom wall 11, an inner side wall 12 and an outer side wall 13; these two side walls merge into each other at the ends and are disposed substantially perpendicularly to the bottom wall 11. The bottom wall is formed with nail holes 14, and the edges of the side walls 12 and 13 are formed with a plurality of hooks 16 which are disposed in spaced relationship on the rearwardly directed forks of the shoe and protrude into the channel 15, said hooks 16 having end faces 16a which face the bottom wall 11. The top side of each hook curves from the outer side of the side wall inwardly toward the hook edge. This facilitates the pressing operation of the ridge member of the lower part into the upper part as described below. The front portion of the upper part has welded to it a triangular plate 17 which forms a so-called toe-clip, and the front portion of the outer side wall 13 is formed with a rectangular opening or recess 18. The lower part shown in FIGS. 3 and 4 is generally designated by 20 and is moulded of a suitable, elastic and wear-resistant plastics material, such as polyurethane, and consists of an outer member 21 and a ridge member 22 intended to be inserted into the channel 15 of the upper part 20. This ridge member is somewhat narrower than the outer member 21 so as to provide a shoulder 23 at the transition between the two parts; this shoulder 23 extends all the way round along the lower part and engages, in the finished shoe, the lower edge of the side walls 11 of the upper part 10. The advantage of this construction is that the greatest possible amount of material of the ridge member between the hook engagement face of the individual recess and the top side of the ridge member is available for retaining the lower part in the upper part. The top side of the ridge member 22 is formed with a plurality of recesses 24 to receive the heads of the nails by which the upper part 10 is nailed to the horse's hoof. The side walls of the ridge member 22 are formed with substantially wedgeshaped recesses 25 to receive the hooks 16 on the upper part 10. The lower edge of the recesses 25 are disposed at the shoulder 23, and the side face 26 of these recesses, intended to engage the end face 16a of the hooks 16, slopes slightly inwards from the side wall of the ridge member and away from the top side of the ridge member. The rear ends of the lower part are formed with bevels 27 on the underside. The upper portion of the ridge member 22 has an upwardly decreasing cross-section to ensure that the ridge member is guided correctly into the channel-shaped upper part without any tendency of "turning over", just as the impression itself is facilitated. Preferably, the height of the ridge member 22 is at least half the height of the entire lower part 20.

In the front portion of the lower part 20 there is embedded a metallic insert which is shown in FIG. 5 and is generally designated by 30. This insert is made of wear-resisting steel or by pressing and sintering of a powder of a metal alloy giving a hard and wear-resisting product. The insert consists of a plate 31 whose underside, in the finished lower part, is coplanar with the underside of the outer member 21 and thus forms a thread face at the point of maximum wear. In the shown embodiment the front edge of the plate 31 protrudes slightly from the side wall of the outer member 21. The top side of the plate 31 has an upwardly extending element 32 whose top is formed with a forwardly directed, horizontal flange 33 forming, in the finished lower part, a projection which protrudes from the front portion of the side wall of the ridge member 22. When the lower part 20 has been placed in position in the upper part 10, there is only a relatively thin layer of plastics material between the rear side of the member 32 and the inner side wall 12 of the upper part. The top side of the plate 31 also mounts two pins 34 which are formed with heads and serve to anchor the insert in the material of the lower part 20.

The lower part 20 is applied to the upper part 10 nailed to the hoof by inserting the projection 33 on the lower part into the recess 18 in the upper part, the lower part being kept inclined with respect to the upper part, and then the horse is allowed to tread on the shoe so that the ridge member 22 of the lower part is progressively pressed up into the channel 15 of the upper part. This pressing movement causes the ridge member 22 to be deformed by the projecting hooks 16 on the side walls 12 and 13 of the upper part. As the ridge member is pressed into position, first the front portion and finally the rear portions, the hooks 16 snap into the corresponding recesses 25 in the side walls of the ridge member, causing the end face 16a of the hooks to engage the just slightly inclined side faces 26 of the recesses 25. This engagement forms a locking engagement which cannot be released by the influences the horseshoe will experience even under extreme conditions such as jumping and difficult terrain.

The lower part is removed by inserting a hoof cleaner or a similar tool, e.g. a screwdriver, between the rear end wall on one fork of the upper part 10 and the lower part 20 and tilting it about the edge of the wall. The lever or crowbar effect thus provided produces a sufficient force to overcome the resistance offered by the rear end of the side face 26 in the closest recess 25 against yielding elastically to the pressure from the end face 16a of the corresponding hook 16. Once this resistance has been overcome, the rear end portion of the lower part can be released by rolling-off movement as the edge of the recess point by point slides over the hook edge with elastic deformation of the material around the recess. When the end portion in question of the lower part has thus cleared the upper part, the other recesses in the fork in question can be released one by one from their hooks by rolling-off movements like the one described in the foregoing, so that the entire fork is gradually released. Then the same process is repeated with the other fork of the lower part, and once this fork too has been released, the forwardly directed projection 33 can be pulled out of the recess 18. The removal has thus been completed, and another lower part can be applied.

When a horse gallops it may happen that the rear hooves hit the front hooves. This might conceivably provide precisely the action on the rear ends of the lower parts on the front hooves of the horse which is required for the lower part to be removed. Such influence, however, is prevented by the bevels 27.

In the underside of the lower part 20 there may in a known manner be embedded spikes (not shown) for use on an icy surface or calks for use on a soft surface or other forms of anti-slippage means.

The embodiment of the horseshoe of the invention which is shown in FIGS. 6-10 differs from the one shown in FIGS. 1-5 and described in the foregoing only in the structure of the locking means and the rear ends of the two parts and in the provision of two oblong recesses 24a instead of individual recesses 24 for nail heads in each fork. The same reference numerals are used in FIGS. 6–10 as in FIGS. 1–4 for corresponding parts which are the same in the two embodiments.

The outer member 21 of the lower part 20 shown in FIGS. 8 and 9 has rearwardly an end portion 49 instead of a bevel; the end portion 49 is somewhat narrower than the rest of the outer member and is softly rounded and slopes rearwardly. Moreover, in a rearwardly extending end face of the ridge member 22 there is formed a groove 28 which is relatively wide and low and extends in the entire height of the ridge member. Further, the rear end wall of the upper part is a little lower than the side walls of the channel as shown at 48 in FIG. 7.

The depression or cut 48, which is formed by the lower channel end wall, facilitates the introduction of a hoof cleaner or other tool between the upper part and the lower part to remove the second, and the further introduction is additionally facilitated in that the groove 28 serves as a guide for the tool.

The insert, which is shown in FIG. 10, is generally designated by 40 and consists of a plate 41 forming a wear bracket in the toe portion of the lower part 20. The top side of the plate 40 mounts a punched and bent bridge member 42, which is formed of a metal plate and has two end lugs 46 welded to the plate 41. In the centre of its front edge the bridge member moreover has a forwardly directed locking hook 43 which is supported by an angularly bent bridge member portion 44 welded to the plate 41. The bridge member is also supported and stiffened by an angularly bent portion 45 welded to the plate 41, at the central portion of its rear edge. The bridge member 42 is moreover formed with holes 47 serving to improve the anchoring of the insert in the material of the lower part.

As shown in FIGS. 6 and 7 the central portion of the outer side wall 13 of the upper part 10 is here formed with a projection 19, which is bent rearwardly into the channel formed by the upper part and forms a locking hook for cooperation with the locking hook 43 of the insert 40. In the front portion of the ridge member of the lower part 20 there is an angular recess 29 in whose one leg, which is parallel with the top side of the ridge member, the locking hook 43 of the insert is so disposed that, after the other leg of the recess, which is perpendicular to and terminates in the top side of the ridge member, has been passed down over the locking hook 19 of the upper part, the locking hook 43 can be caused to overlap the locking hook 19 by rotation of the lower part with respect to the upper part. In this position of overlap the edge hooks 16 of the upper part are in register with the recesses 25 in the ridge member 22 of the lower part, and the lower part can thus be pressed into position in the upper part; the engagement of the hooks 16 in the recesses 25 locks the two locking hooks 19 and 43 in the position of overlap by preventing such rotation of the lower part with respect to the upper part as is required to urge the locking hooks apart from the position of overlap. In this position the lower part is firmly fixed on the upper part.

The outer member 21 on the lower part 20, whose rear portion is shown in FIG. 11, is formed in the same manner as the one shown in FIGS. 8 and 9 with a rearwardly narrowing and inclined end portion 49. The top portion of the ridge member 22, however, is formed with inclined side faces 50, as shown in FIG. 12 too, to facilitate introduction of the ridge member into the channel-shaped upper part. Moreover, the regions of the side faces of the ridge member which are disposed between a recess 25a to receive a hook 16 on the upper part and the upper edge of the ridge member, are formed with longitudinal grooves 51 which further facilitate the application of the lower part because the ridge member need only be pressed manually so deep into the channel of the upper part that at least one hook on each fork enters one of the grooves 51 opposite the corresponding recess 25a. This engagement is sufficient to keep the lower part in position until the horse presses the ridge member right up in the upper part by treading on the shoe. The structure shown in FIG. 11 further differs from the one of FIGS. 8 and 9 in that its groove 28 is here replaced by a depression 28a forming a cavity in the rear end of each fork.

The ridge member of the lower part may be secured in the upper part using special nails instead of or in addition to the edge hooks 16 on the upper part, said special nails cooperating with recesses in the top side of the ridge member as shown in FIGS. 13 and 14 in two various embodiments.

In FIG. 13 the nail is generally designated by 52, its head by 54 and its shank by 53. Both the head and the shank are rectangular in cross-section with the greatest dimension in a direction perpendicular to the plane of the paper. The head 54 is pagoda-shaped so that the uppermost part forms an annular hook 55 which, in co-operation with an engagement face 56 provided by a recess 57 in the ridge member 22 produces a locking effect similar to the effect of the hooks 16 and the recesses 25 in the horseshoes described previously. The head on the nail of FIG. 14 has a frustoconical end portion 58 which is separated from a box-shaped inner portion 60 by an annular, protruding flange 59. The flange 59 provides the intended locking effect in cooperation with an annular groove 61 which is part of a recess 62 formed in the ridge member 22 to receive the nail head.

The locking effect provided by nails such as those shown in FIGS. 13 and 14 can also be obtained by means of projections which are secured to the bottom of the channel formed by the upper part and have the same shape as the nail heads or a shape similar thereto.

The edge hooks 16 on the upper part 10 may be produced in the manner schematically shown in FIGS. 15–18. The upper part 10 is preformed with projections 63 on the edges of the side walls 12 and 13. During the first phase of this process the projections are bent inwardly through an angle of about 45°. This closure is effected by means of the pressing tool which is shown in FIGS. 15 and 16 and is generally designated by 70. The tool is a sandwich of three tempered steel plates, the central one 71 of which has in its lower edge a trapezoidal cut whose two inclined edges 72 form an angle with the recessed portions of the lower edge and are spaced from each other such that, when the tool is pressed down over the upper part, they bring about the desired bending of the projections 63. The two outermost plates 73 of the tool 70 have a width corresponding to the distance between the side walls 12 and 13 of the upper part and protrude such a distance below the central plate 71 that it can serve as a guide during the pressing operation. The portions of the edges of the outer plates disposed opposite the inclined edges 72 also serve as antibackup means for the side walls of the upper part to prevent the wall portions which adjoin the ends of the projections 63 from being pressed into the channel. It has been found that the risk of ruptures or cracks in the material during the pressing operation can be reduced or eliminated by providing a scratch in the side wall edges at each side of the projection prior to the pressing operation.

After the termination of the pressing operation the upper part 10 has the profile shown in FIG. 17 with inwardly bent projections 63. The next phase of the manufacturing process can be effected with a swage 75, FIG. 17, which has two semi-circular cuts 76 in the lower edge, the outer edges of the cuts being spaced from each other corresponding to the spacing between the outer sides of the side walls 12 and 13 of the upper part; the size of the cuts is so adapted that upon inward movement of the swage 75 over the upper part 10 and against a block-shaped anvil 77 in the channel thereof they convert the projections 63 to hooks 16 with a curved top side and a plane underside 16a disposed perpendicularly to the side wall 12 or 13 as shown in FIG. 18. In this swage forging process the side walls 12 and 13 are bent slightly outwards, but enough for the anvil 77 to be removed without difficulty after completed operation by manipulating a handle 78 secured on the anvil.

FIG. 19 shows an insert 80 consisting of a plate which is bent to substantially form a channel with a bottom 81 and two curved side walls 82 and 83. The bottom 81 is welded to the top face of a wear plate here designated by 84. The side walls 82 and 83 are formed with inwardly bent lugs 85 and 86, respectively, serving to improve the anchoring of the insert in the lower part. With the same end in view holes 87 are provided both in the side walls 82 and 83 and in the lugs 85 and 86. A longitudinal slit 88 slightly spaced from the bottom 81 is formed in the front side wall 82, defining a free edge strip 89 of the wall 82. Part of this edge strip is bent inwardly to form a recess 90 which, under the application of the lower part, allows the edge strip to pass past the locking hook 19 of the upper part so that the non-inwardly bent portion 91 of the edge strip, which forms the locking hook of the insert, can then be moved over the locking hook 19 of the upper part by rotating the lower part with respect to the upper part to lock the two parts. Provided that the edge strip 89 has a reasonable width this embodiment is able to retain the lower part on the upper part against greater forces than the one shown in FIG. 19.

When the lower part is provided with calks it may be desirable under particularly severe conditions, e.g. competitive riding, that the front calks which are subjected to the strongest influences are better secured than is possible by embedding in the plastics of the lower part, alone. Such particularly effective securing can be obtained when the calk as shown in FIG. 20 extends through holes in the wear plate 84 and the bottom 81 of the channel-shaped portion 80 and engages the hole 87 in the lug 86 with its conical end portion 93. A similar arrangement without the use of a wear plate is shown in FIG. 21.

To further improve the anchoring of the insert in the lower part, the insert may be formed with various forms of projections, e.g. such a welded angle 94 with a hole 95 as is shown in FIG. 22.

The nail holes 14 in the upper parts shown in FIGS. 1, 2, 6 and 7 are produced by punching of small, rectangular pieces of material. In the upper part embodiment shown in FIG. 23 the nail holes, here designated by 96, are produced without punching of material, viz. by first producing a depression by means of a die and then pressing or hammering a mandrel through the bottom of the depression to produce a crater-like nail hole with burr walls 97 which usually have a somewhat irregular, serrated form. Sharp edges and points on these burr walls may be removed or rounded by a subsequent treatment, e.g. by placing the upper part in a granular abrasive material in a rotary drum. Such nail holes with pressed burr walls which are beaten into the horse's hoof during shoeing present greater engagement faces for the nails and thus offer a more realiable securing of the upper part. Also, such connection is established between the shoe and the hoof that horizontal forces on the shoe are transmitted directly to the hoof so that the shoe is effectively prevented from being displaced on the hoof.

In practice the horseshoe of the invention may be cnstructed in other ways than those shown in the drawing and described in the foregoing. For example, the side walls of the upper part need not be exactly perpendicular to the bottom wall, but may optionally be inclined slightly inwardly to produce a dovetail-effect, or slightly outwardly to facilitate application and removal of the lower part. Instead of the edge hooks 16 on the upper part side walls, inwardly extending projections may optionally be punched in these walls. The distribution and arrangement of projections and recesses may be varied in many ways. On the same horseshoe there may also be used combinations of the features described in the foregoing.

I claim:

1. In a horseshoe having a fixed, channel-shaped upper part with a bottom wall intended for engagement with a horse's hoof and a front and rear side wall and an exchangeable lower part of an elastic material, said lower part having a ridge member having side walls and a top side intended for insertion into the channel of the upper part and an exposed underside, the upper part being firmly connected to the ridge member of the lower part by cooperating projections and recesses, the improvement wherein the projections are provided on the upper part and have a top side that inclines inwardly and downwardly from the edges of the side walls toward the bottom wall of the channel of the upper part and that terminate in a flat end face extending substantially perpendicular to the side wall and spaced from the bottom wall of the channel, said projections engaging with an opposing face of a cooperating recess formed in the side walls of the ridge member of the lower part, said projections snapping into the recesses upon impression of the ridge member of the lower part into the channel of the upper part to thereby lock the parts together, and an insert of a hard, strong material embedded in the toe portion of the lower part, said insert having a locking member which engages with a cooperating locking member in the upper part, in which engaging position the two locking members are fixed by said snapping of said projections into said recesses.

2. The horseshoe of claim 1, in which the insert has a portion that, in the assembled horseshoe, protrudes upwardly in front of the rear side wall of the upper part.

3. The horseshoe of claim 1 or 2, in which the locking member in the upper part comprises a recess in the front portion of the front wall of the upper part and the locking member in the insert comprises a projection on the insert that engages with said recess.

4. The horseshoe of claim 1 or 2, in which the locking member in the upper part comprises a first locking hook extending rearwardly from the front portion of the front side wall of the upper part and the locking member in the insert comprises a second locking hook, whereupon displacement of the lower part with respect to the upper part, the two locking hooks can be caused to overlap each other, with the locking hook of the insert disposed closest to the channel bottom of the upper part.

5. The horseshoe of claim 1, in which the insert is of a wear-resisting material and is so shaped that it also forms a wear bracket on the central portion of the underside of the lower part.

6. The horseshoe of claim 1, including calks secured in the insert.

7. The horseshoe of claim 1, in which the top side of the projections facing away from the bottom of the channel curves from the side wall towards the flat end face.

8. The horseshoe of claim 1, in which longitudinal grooves are formed in the sides of the ridge member between the recesses and the top of the ridge member.

9. The horseshoe of claim 1, in which the lower part has a shoulder face at the bottom of the ridge member for engagement with the edges of the side walls of the upper part, and the recesses in the side walls of the ridge member adjoin the shoulder face.

10. The horseshoe of claim 1, in which the height of the ridge member is at least half the height of the lower part.

11. The horseshoe of claim 1, in which the upper portion of the ridge member has an upwardly decreasing cross-section.

12. The horseshoe of claim 1, in which a depression is formed in the rearwardly directed end faces of the ridge member of the lower part, and a shallow cut is formed in the edge of the rearwardly directed end walls of the upper part.

13. The horseshoe of claim 1, in which the rear ends of the underside of the lower part are rounded and slope rearwardly.

14. The horseshoe of claim 1, including a nail for securing the upper part of the horseshoe to a horse's hoof, said nail having a shank and a head and formed with a shoulder face at least along part of its periphery, said shoulder face being directed towards and spaced from the nail shank.

15. The horseshoe of claim 14, in which the nail has a cross-sectionally retangular head and the shoulder face is on two opposite wide sides of the nail head.

16. The horseshoe of claim 14, in which each shoulder face of the nail is formed by a cut with a substantially triangular cross-section in the side of the nail head.

17. The horseshoe of claim 14, in which each shoulder face of the nail is formed by a bead on the side of the nail head.

18. The horseshoe of claim 14, in which the outer end portion of the nail head defined by the shoulder face is frustoconical in shape.

19. The horseshoe of claim 14, in which the top side of the lower part is formed with recesses to receive the nails, and these recesses have a face that engages the shoulder face of the nail head.

* * * * *